(12) United States Patent
Makiuchi et al.

(10) Patent No.: US 8,601,703 B2
(45) Date of Patent: Dec. 10, 2013

(54) WORKPIECE CENTERING APPARATUS AND WORKPIECE CENTERING METHOD

(75) Inventors: Akira Makiuchi, Anjo (JP); Ikuya Kato, Nagoya (JP); Keita Goto, Okazaki (JP); Yoshihiro Somyo, Okazaki (JP); Kenichi Yabuki, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 210 days.

(21) Appl. No.: 13/314,356

(22) Filed: Dec. 8, 2011

(65) Prior Publication Data

US 2012/0174424 A1  Jul. 12, 2012

(30) Foreign Application Priority Data

Jan. 11, 2011 (JP) ................. 2011-002914

(51) Int. Cl.
*G01B 5/25* (2006.01)

(52) U.S. Cl.
USPC .............................................. 33/520; 33/550

(58) Field of Classification Search
USPC ............ 33/520, 549, 550, 551, 553, 554, 555
See application file for complete search history.

(56) References Cited

U.S. PATENT DOCUMENTS

| | | | | |
|---|---|---|---|---|
| 3,125,811 A * | 3/1964 | Pierce et al. | | 33/550 |
| 3,259,989 A * | 7/1966 | Wilson | | 33/520 |
| 3,270,423 A * | 9/1966 | Birrell et al. | | 33/569 |
| 6,327,788 B1 * | 12/2001 | Seddon et al. | | 33/551 |
| 6,519,861 B1 * | 2/2003 | Brueck et al. | | 33/507 |
| 6,530,157 B1 * | 3/2003 | Henderson et al. | | 33/644 |
| 6,671,973 B2 * | 1/2004 | Takemura et al. | | 33/551 |
| 6,886,264 B2 * | 5/2005 | Sakata et al. | | 33/502 |
| 7,290,348 B2 * | 11/2007 | Katamachi | | 33/550 |
| 7,636,646 B2 * | 12/2009 | Kojima | | 702/168 |
| 8,336,223 B2 * | 12/2012 | Nakayama et al. | | 33/550 |
| 2004/0038787 A1 | 2/2004 | Watanabe | | |

* cited by examiner

*Primary Examiner* — Christopher Fulton
(74) *Attorney, Agent, or Firm* — Oblon, Spivak, McClelland, Maier & Neustadt, L.L.P.

(57) ABSTRACT

The positions of at least three points, which are circumferentially, and equiangularly, offset from each other, of a peripheral face of a workpiece set on a rotary table are measured using a position detection probe. The amount of runout of the axis of the workpiece and a phase position of the workpiece, at which the runout amount is largest, are calculated from the measured positions of the equiangularly offset points. The rotary table is turned to set the largest runout phase position of the workpiece in a position opposed to a workpiece contact of a centering apparatus. The relative positions of the workpiece and a position detection block are calculated using the position detection probe. The workpiece is centered by moving a centering shaft member of the centering apparatus such that the workpiece contact pushes the workpiece by a distance corresponding to the runout amount.

7 Claims, 7 Drawing Sheets

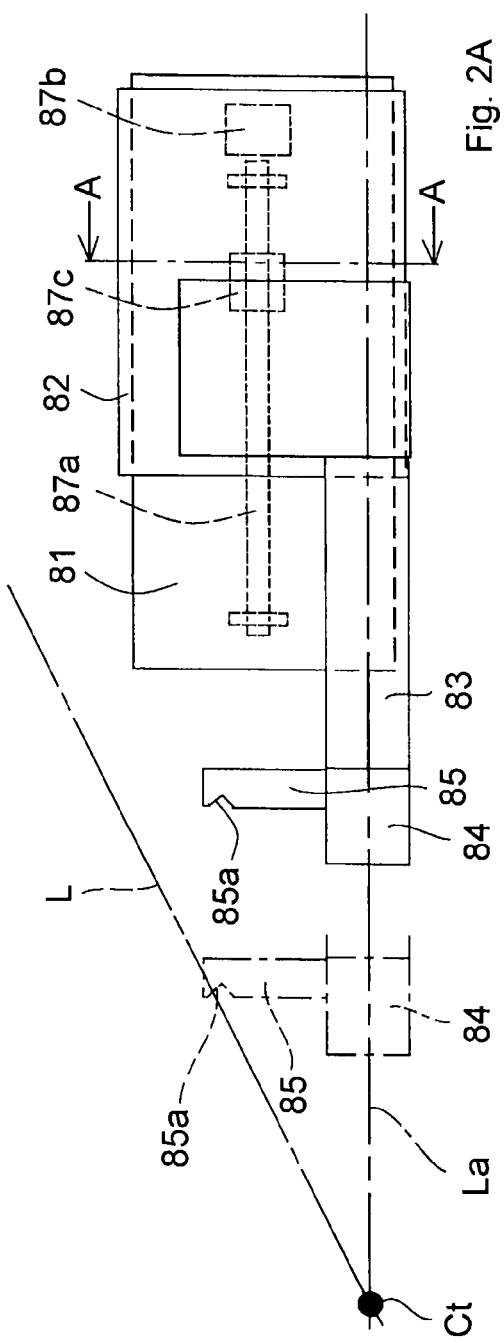
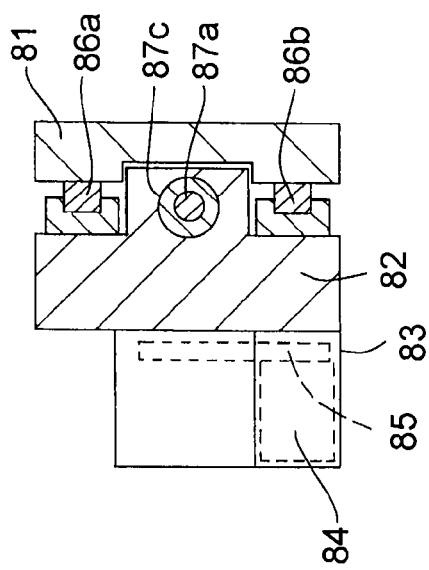
Fig. 2A
Fig. 2B

WORKPIECE CENTERING APPARATUS AND WORKPIECE CENTERING METHOD

INCORPORATION BY REFERENCE

This application claims priority to Japanese Patent Application No. 2011-002914 filed on Jan. 11, 2011 the disclosure of which, including the specification, drawings and abstract, is incorporated herein by reference in its entirety.

BACKGROUND OF THE INVENTION

1. Field of the Invention

The invention relates to a centering apparatus and a centering method each adapted to center a cylindrical workpiece set on a rotary table.

2. Discussion of Background

For example, US Patent Application Publication No. 2004/0038787 describes a machine tool that includes a centering jig attachable to a tool spindle and a runout measuring device that measures a runout due to decentering of a workpiece attached on a spindle. According to a workpiece centering method implemented by this machine tool, the runout measuring device measures the runout of the workpiece by turning the spindle. Then, the tool spindle is moved to press the centering jig against the workpiece. Based on the measured runout of the workpiece, the workpiece is pushed and centered by the centering jig.

According to the workpiece centering method described above, if the centering jig is excessively pressed against the workpiece and the axis of the workpiece passes beyond the rotation axis of the spindle, the workpiece is again decentered, resulting in another runout of the workpiece. That is, in such a case, due to the rotational force of the workpiece and the pressing force of the centering jig, the distance between the axis of the workpiece and the rotation axis of the spindle may further increase, and consequently, the workpiece may fall off the spindle.

One possible option for preventing the problem described above is to lower the speed at which the centering jig pushes the workpiece. This, however, is very time-consuming. Further, because the centering jig stops pushing the workpiece before the axis of the workpiece coincides with the rotation axis of the spindle, the runout of the workpiece is not completely eliminated, causing a certain degree of centering error.

Further, because the centering jig is attached on the tool spindle, a device that automatically switches the component attached on the tool spindle between the centering jig and a tool is required. Therefore, the switching work is very time-consuming. Further, because the centering jig is attached on the tool spindle, there is a possibility that the centering jig will come into contact with other member(s) as the tool spindle moves.

SUMMARY OF THE INVENTION

The invention provides a workpiece centering apparatus and a workpiece centering method that make it possible to easily perform accurate workpiece centering.

According to a feature of an example of the invention, a centering apparatus brings a position detection probe into contact with at least three circumferentially-offset points of a peripheral face of a workpiece on a rotary table, and measures the positions of the respective contact points between the position detection probe and the workpiece. Then, the centering apparatus calculates the amount of runout of the axis of the workpiece and a phase position of the workpiece, at which the runout amount is largest, based on the measured positions of the contact points on the peripheral face of the workpiece. As such, the position of the center of the workpiece and the radius of the workpiece are determined, and therefore the amount of runout of the axis of the workpiece with respect to the rotation axis of the rotary table and the direction of the runout are accurately determined. Subsequently, the centering apparatus turns the rotary table such that the largest runout phase position of the workpiece is set in a position opposed to the workpiece contact of the centering apparatus. Then, the centering apparatus determines the relative positions of the workpiece and the workpiece contact based on the positions of the contact points of the peripheral face of the workpiece and the position of the position detection block. As such, the relative positions of the workpiece and the position detection block are determined. Then, because the positional relation between the contact face of the position detection block and the contact face of the workpiece contact, which comes into contact with the workpiece, is known, the position of the workpiece contact relative to the workpiece is accurately determined. As a result of the processes described above, the positional relation between the workpiece, the rotary table, and the workpiece contact is determined, and then the centering shaft member of the centering apparatus is moved such that the workpiece contact pushes the workpiece by a distance corresponding to the runout amount. In this way, the workpiece is centered accurately.

According to another feature of an example of the invention, the centering apparatus is mounted on a bed on which the rotary table is provided, and therefore a device that automatically switches the component fitted to a tool spindle between a centering jig and a tool, which is conventionally required, is omitted, and thus it is no longer necessary to secure a mounting space for such an automatic switching device. Further, conventionally, a centering jig is provided at a tool spindle, and therefore there is a possibility that the centering jig contact other member(s) during movement of the tool spindle. According to the above-described example feature of the invention, on the other hand, there is no possibility of such a contact, and further the relative thermal displacements of the centering apparatus and the rotary table are reduced.

According to another feature of an example of the invention, the centering apparatus moves the position detection probe to a position that is on a side opposite, across the workpiece, to where the workpiece contact is present and that is a distance corresponding to the runout amount away from the outer peripheral face of the workpiece, and keeps the position detection probe in this position. Then, the centering apparatus moves the workpiece contact to push the workpiece until the peripheral face of the workpiece contacts the position detection probe. As such, the centering apparatus is able to determine that the workpiece has been accurately pushed by the distance corresponding to the runout amount, and this reduces the cycle time of the centering.

According to another feature of the invention, the centering apparatus is arranged such that the centering shaft member is inclined by a predetermined angle with respect to the movement direction of the position detection probe that is orthogonal to the rotation axis of the rotary table. This arrangement prevents a contact between the position detection probe and the centering apparatus during movement of the position detection probe. Further, the contact face of the position detection block, which comes into contact with the position detection probe, is formed such that the contact face extends in a direction orthogonal to the movement direction of the position detection probe. As such, the position of the position detection block is accurately detected.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2A is a top view of the centering apparatus;

FIG. 2B is a sectional view taken along the line A-A in FIG. 2A;

DETAILED DESCRIPTION OF EMBODIMENTS

Hereinafter, example embodiments of the invention will be described with reference to the accompanying drawings.

A centering apparatus described in the following is used to center a columnar or cylindrical workpiece. As an example, a case where the centering apparatus is provided in a vertical grinding machine 1 will be described with reference to FIGS. 1A and 1B. Further, in the following example case, the cylindrical workpiece is centered when its outer peripheral face is ground by the vertical grinding machine 1.

Figure 1A:
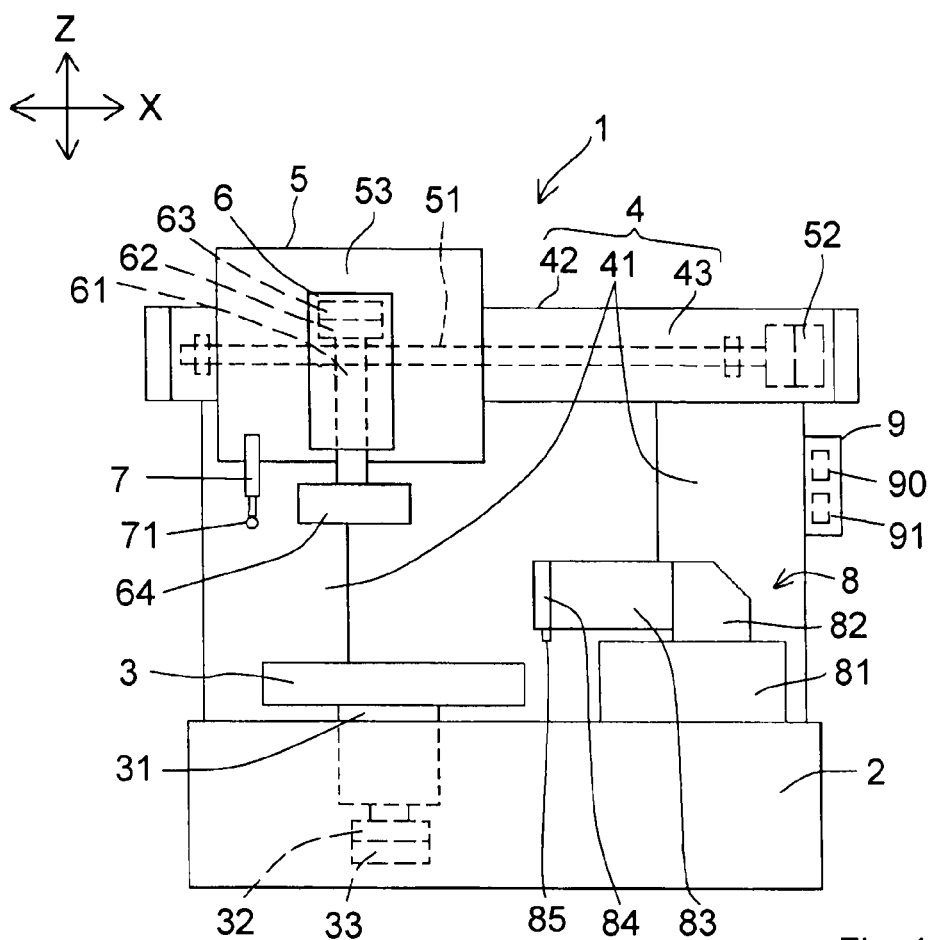
FIG. 1A is a front view of a vertical grinding machine that includes a centering apparatus according to an example embodiment of the invention.
Figure 1B:
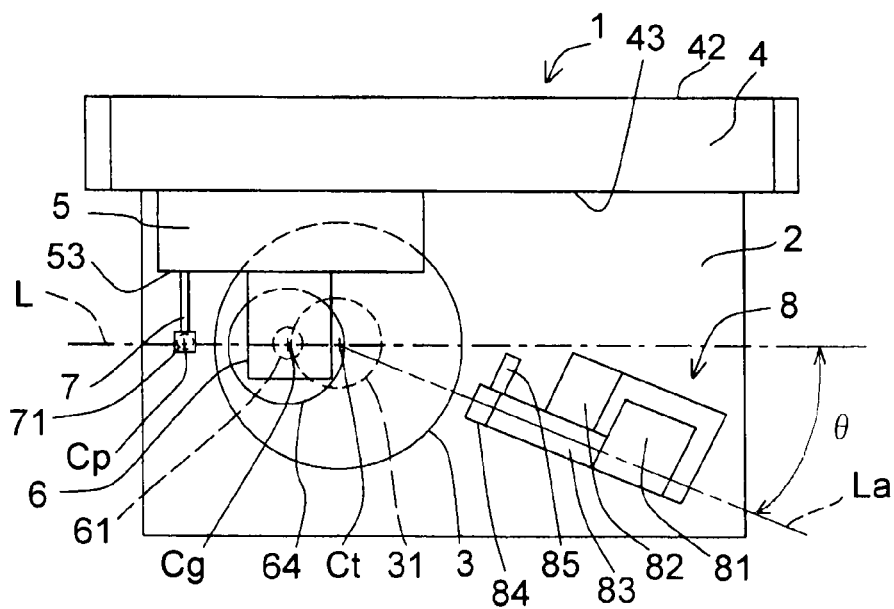
FIG. 1B is a top view of the vertical grinding machine.

As shown in FIGS. 1A and 1B, the vertical grinding machine 1 includes a bed 2, a rotary table 3, a column 4, a slider 5, a tool spindle head 6, a position detection touch sensor 7, a centering apparatus 8, and a control unit 9.

The bed 2 is generally rectangular, and is set on a floor. However, the shape of the bed 2 is not limited to a rectangular shape. The rotary table 3 and the centering apparatus 8 are mounted on the bed 2. The column 4 is provided upright at the rear side of the bed 2.

The rotary table 3 is circular, and is provided on the top of a rotation spindle 31 that is arranged at the bed 2 and extends vertically (i.e., in the Z-axis direction) such that the rotary table 3 is rotatable together with the rotation spindle 31. A rotation spindle motor 33 having a gear mechanism 32 that turns the rotation spindle 31 (rotary table 3) about the Z-axis is embedded in the bed 2. The rotation spindle motor 33 has an encoder used to detect the rotation angle of the rotation spindle motor 33. Therefore, it is possible to stop the rotation spindle 31 (rotary table 3) at a desired rotation angle position (phase). The workpiece is set on the rotary table 3, and magnetically fixed in its position.

The column 4 is shaped like a bridge, and is provided upright at the rear side of the bed 2. The control unit 9 is attached on one of leg members 41 of the column 4. The slider 5 is provided at an upper member 42 of the column 4.

The slider 5 is provided so as to be movable laterally (i.e., in the X-axis direction), that is, in the left-right direction as viewed in FIG. 1A, along a guide face 43 formed at the front side (face) of the upper member 42 of the column 4. A slider motor 52 that has a ball screw mechanism 51 used to move the slider 5 in the X-axis direction is provided at the upper member 42 of the column 4.

The tool spindle head 6 is provided so as to be movable vertically (i.e., in the Z-axis direction), that is, in the up-down direction as viewed in FIG. 1A, along a guide face 53 formed at the front side (face) of the slider 5. A tool spindle 61 extending vertically (i.e., in the Z-axis direction) is supported by the tool spindle head 6 such that the tool spindle 61 is rotatable about the Z-axis. A tool spindle motor 63 is embedded in the tool spindle head 6. The tool spindle motor 63 has a gear mechanism 62 that turns the tool spindle 61 about the Z-axis. A grinding wheel 64 used to grind the outer peripheral face of the workpiece is detachably attached at the lower end of the tool spindle 61. That is, the grinding wheel 64 is attached so as to be rotatable about the Z-axis relative to the tool spindle head 6.

The position detection touch sensor 7 is provided on the front face of the slider 5 so as to be movable vertically (i.e., in the Z-axis direction). Further, the position detection touch sensor 7 is movable also in a direction orthogonal to the rotation axis of the rotary table 3 as the slider 5 moves. The slider 5 is provided with a sensor motor (not shown in the drawings) having a ball screw mechanism used to move the position detection touch sensor 7 in the Z-axis direction. The position detection touch sensor 7 is provided with a position detection probe 71 extending downward (i.e., downward in the Z-axis direction). An axis Cp of the position detection probe 71, an axis Ct of the rotation spindle 31 (rotary table 3), and an axis Cg of the tool spindle 61 are aligned with each other on a line L extending in the X-axis direction.

The centering apparatus 8 includes a stationary portion 81, a movable portion 82, a centering shaft member 83, a workpiece contact 84, and a position detection block 85, which will be described in detail one by one. Because the centering apparatus 8 is mounted on the bed 2 on which the rotary table 3 is provided, a device that automatically switches the component attached on a tool spindle between a centering jig and a tool, which is conventionally required, may be omitted. Therefore, it is no longer necessary to secure a mounting space for such an automatic switching device. Further, conventionally, a centering jig is fitted to a tool spindle, and therefore there is a possibility that the centering jig may contact other member(s) during movement of the tool spindle. With the above-described structure of the example embodiment, on the other hand, there is no possibility of such a contact. Further, the relative thermal displacements of the centering apparatus 8 and the rotary table 3 are reduced.

The centering shaft member 83 is arranged in such a manner that the axis of the centering shaft member 83 passes through the axis Ct of the rotation spindle 31 (rotary table 3) and coincides with a line La that is inclined by a predetermined degree θ with represent to the line L. That is, the centering shaft member 83 is arranged in such a manner that the centering shaft member 83 is inclined by the predetermined angle θ with respect to the X-axis direction that is orthogonal to the rotation axis of the rotation spindle 31 (rotary table 3) and that is the direction in which the position detection probe 71 moves. This arrangement prevents a contact between the position detection probe 71 and the centering shaft member 83 during movement of the position detection probe 71.

The control unit 9 includes a centering controller 90 that controls the centering operation of the centering apparatus 8, and a grinding controller 91 that controls the grinding operation of the vertical grinding machine 1. However, it is to be noted that the centering controller 90 is not necessarily incorporated in the control unit 9, that is, the centering controller 90 may be provided outside the control unit 9. The centering controller 90 executes workpiece centering control by determining the runout of the axis of the workpiece from the axis Ct of the rotation spindle 31 (rotary table 3) through control of the rotation spindle motor 33, the slider motor 52, the sensor motor (not shown in the drawings), and a movable portion motor 87*b*, which will be described later. The details of the workpiece centering control will be described later. The grinding controller 91 controls, through control of the tool spindle motor 63, etc., the grinding of the outer peripheral face of the workpiece by turning the workpiece and the grinding wheel 64 about the Z-axis while moving the workpiece and the grinding wheel 64 relative to each other in the Z-axis direction and X-axis direction.

Next, the details of the centering apparatus 8 will be described with reference to FIG. 2 schematically showing the structure of the centering apparatus 8. The stationary portion 81 is generally rectangular, and is fixed on the bed 2. The movable portion 82 is generally rectangular, and is provided on the stationary portion 81 such that the movable portion 82 is movable in the axial direction of the centering shaft member 83 (i.e., the direction of the line La). Paired movable portion guide rails 86*a* and 86*b*, which are parallel to each other, are provided on the top face of the stationary portion 81 so as to extend along the axial direction of the centering shaft member 83. The movable portion 82 is slidable on the paired movable portion guide rails 86*a* and 86*b*.

The stationary portion 81 is provided with a threaded shaft 87*a* of a movable portion ball screw, which is arranged between the paired movable portion guide rails 86*a* and 86*b* and is used to move the movable portion 82 in the axial direction of the centering shaft member 83. Further, the stationary portion 81 is provided with a movable portion motor 87*b* used to rotate the threaded shaft 87*a*. Further, a nut 87*c* of the movable portion ball screw, which is screwed to the threaded shaft 87*a*, is provided in the movable portion 82. Driven by the movable portion motor 87*b*, the movable portion 82 moves along the paired movable portion guide rails 86*a* and 86*b*. The movable portion motor 87*b* has an encoder that detects the rotation angle of the movable portion motor 87*b*.

The centering shaft member 83 is arranged so as to protrude from the rotary table 3-side end face of the movable portion 82 in such a manner that the axis of the centering shaft member 83 coincides with the line La. The centering shaft member 83 is movable, together with the movable portion 82, in a direction orthogonal to the rotation axis of the rotary table 3. The centering shaft member 83 may be stopped at a desired position by the movable portion motor 87*b* having the encoder.

The workpiece contact 84 is a generally rectangular parallelepiped. The workpiece contact 84 is provided at the free end of the centering shaft member 83. Thus, as the centering shaft member 83 moves, the workpiece contact 84 comes into contact with the outer peripheral face of the workpiece and then pushes the workpiece in the radial direction of the workpiece.

The position detection block 85 is shaped like a rod. The position detection block 85 is provided so as to protrude from the lower side of the workpiece contact 84, at the free end of the centering shaft member 83, in a direction orthogonal to the axis of the centering shaft member 83. A contact face 85*a* with which the position detection probe 71 may come into contact is formed at the free end of the position detection block 85, and is used to correct the position of the workpiece contact 84. The contact face 85*a* extends in a direction orthogonal to the line L, that is, to the movement direction of the position detection probe 71. With the contact face 85*a* thus formed, the position of the position detection block 85 is detected accurately.

Figure 3:
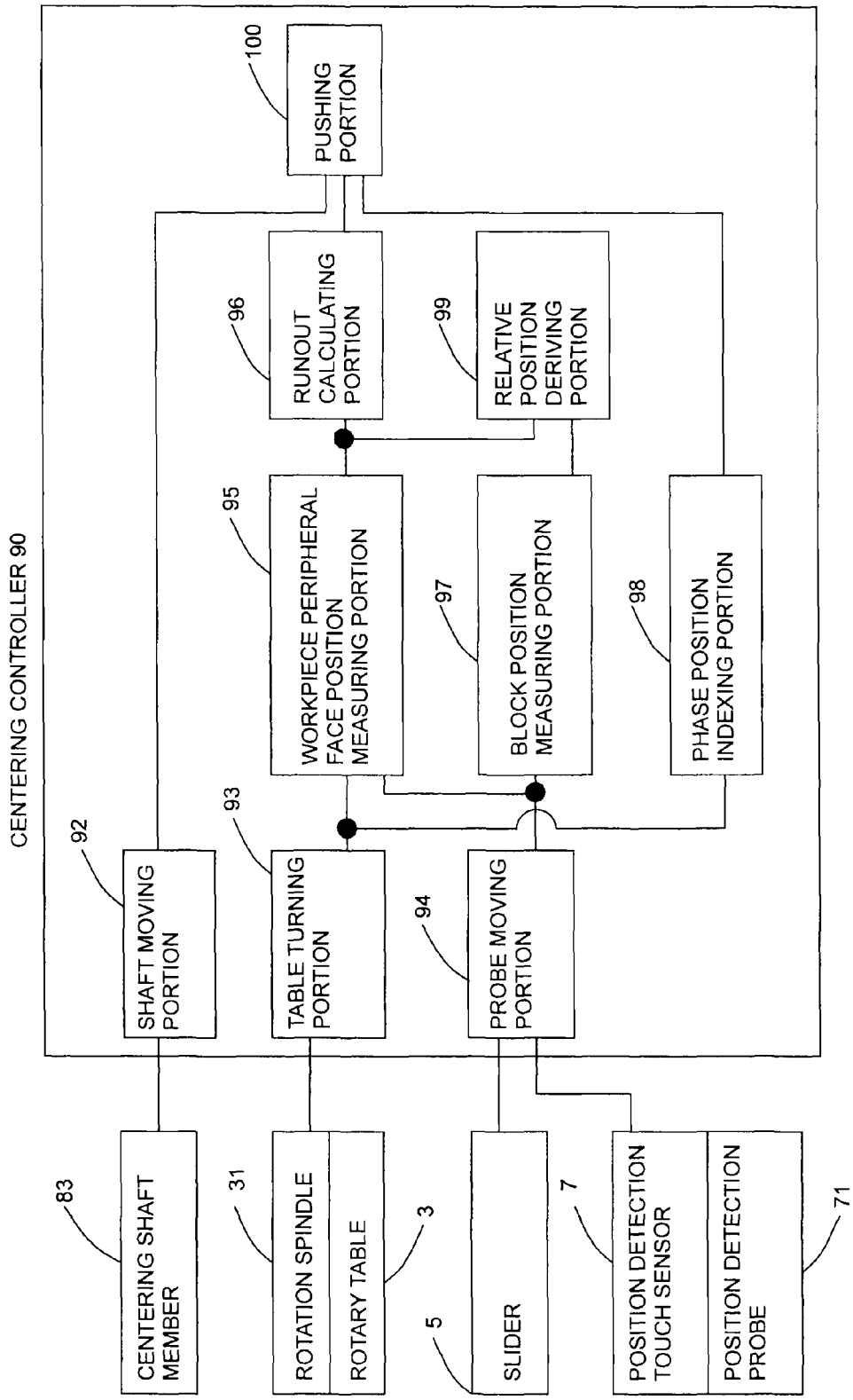
FIG. 3 is a function block diagram illustrating function blocks of a centering controller.

Next, the details of the centering controller 90 will be described with reference to the function block diagram of FIG. 3. Note that in the following descriptions on the centering controller 90, some of the structural elements of the vertical grinding machine 1 shown in FIG. 3 will be described as well. Further, note that in FIG. 3, the structural elements of the vertical grinding machine 1 shown in FIGS. 1A and 1B are denoted by the same reference numerals.

The centering controller 90 includes a shaft moving portion 92, a table turning portion 93, a probe moving portion 94, a workpiece peripheral face position measuring portion 95, a runout calculating portion 96, a block position measuring portion 97, a phase position indexing portion 98, a relative position deriving portion 99, and a pushing portion 100. The shaft moving portion 92 controls the driving of the movable portion motor 87*b* to move the centering shaft member 83. The table turning portion 93 controls the driving of the rotation spindle motor 33 to turn the rotation spindle 31 (rotary table 3). The probe moving portion 94 controls the driving of the slider motor 52 to move the slider 5 (position detection touch sensor 7) in the X-axis direction, and controls the driving of the sensor motor to move the position detection touch sensor 7 (position detection probe 71) in the Z-axis direction.

The workpiece peripheral face position measuring portion 95 brings the position detection probe 71 into contact with at least three positions of the outer peripheral face of the workpiece, which are offset from each other in the circumferential direction, and measures the positions of contact points between the position detection probe 71 and the workpiece with the rotation of the rotary table 3 stopped. The runout calculating portion 96 calculates the amount of runout of the axis of the workpiece, and determines the phase position of the workpiece, at which the runout amount is largest (will hereinafter be referred to as "the largest runout phase position" where necessary), based on the peripheral face contact positions measured by the workpiece peripheral face position measuring portion 95. The block position measuring portion 97 measures the position of the position detection block 85 by bringing the position detection probe 71 into contact with the position detection block 85. The phase position indexing portion 98 causes the largest runout phase position of the workpiece to be opposed to the workpiece contact 84 by turning the rotary table 3. The relative position deriving portion 99 derives the relative positions of the workpiece and the workpiece contact 84 in a state where the largest runout phase position of the workpiece is opposed to the workpiece contact 84, which has been created by turning the rotary table 3, based on the contact positions measured by the workpiece peripheral face position measuring portion 95 and the position of the position detection block 85 measured by the block position measuring portion 97. The pushing portion 100 centers, after the above-described state is created by the phase position indexing portion 98, the workpiece by moving the centering shaft member 83, based on the relative positions determined by the relative position deriving portion 99, such that the workpiece contact 84 pushes the workpiece by an amount corresponding to the runout amount.

Next, the procedure of a centering program executed by the centering controller 90 will be described with reference to FIG. 4. The centering program is executed to control the operations of the centering apparatus 8, etc. so as to center the cylindrical workpiece set on the rotary table 3, as will be described in detail below.

Figure 4:
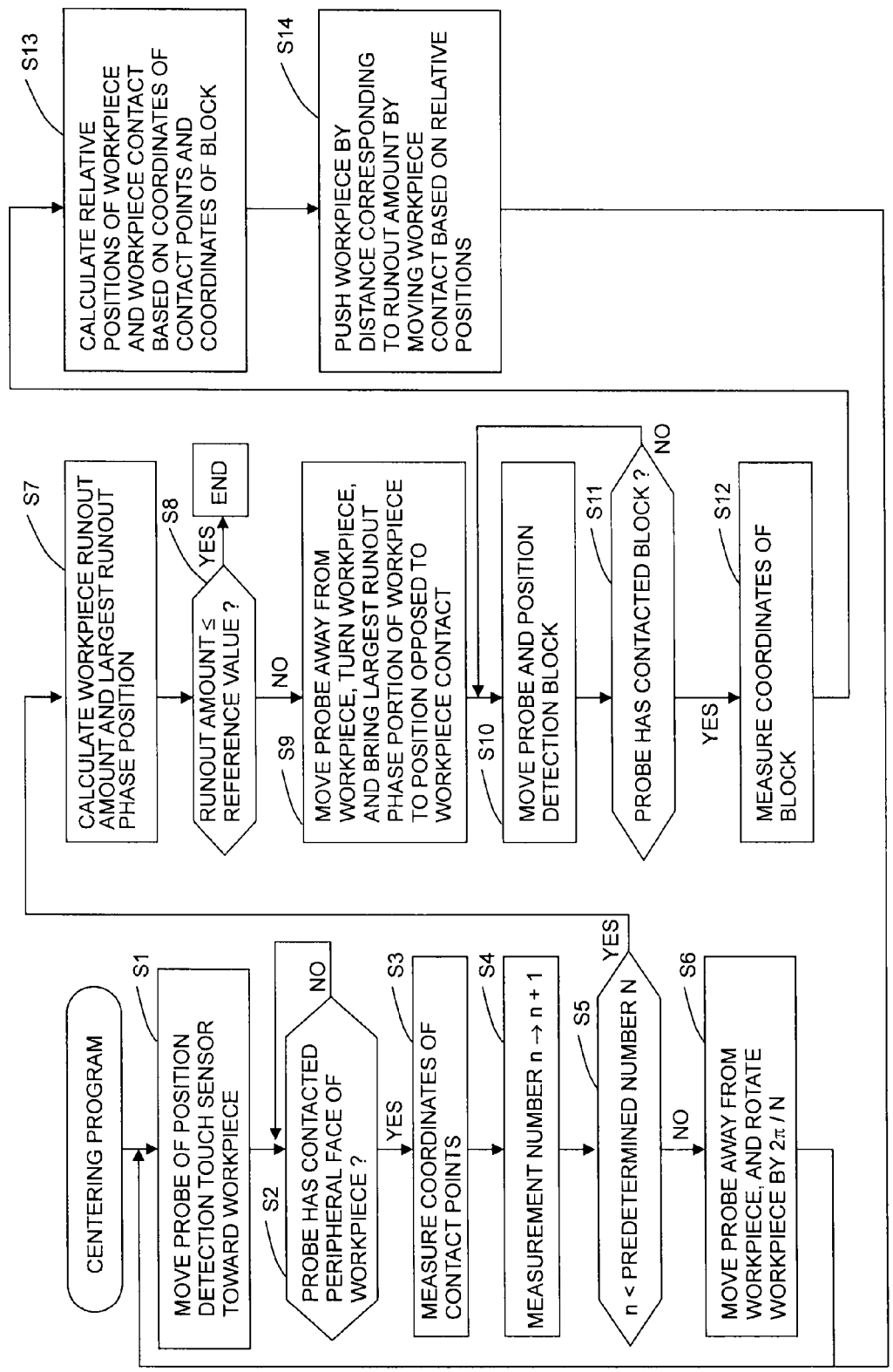
FIG. 4 is a flowchart illustrating the procedure of a centering program.

As shown in FIG. 4, first, the centering controller 90 first moves the position detection probe 71 of the position detection touch sensor 7 toward the workpiece set on the rotary table 3 (step S1). Then, the centering controller 90 determines whether the position detection probe 71 has come into contact with the outer peripheral face of the workpiece (step S2). At this time, if it is determined that the position detection probe 71 has come into contact with the outer peripheral face of the workpiece, the centering controller 90 then measures the coordinates of the contact point (step S3).

Subsequently, the centering controller 90 increments a measurement number n by 1 (step S4), and then determines whether the measurement number n has reached a predetermined number N (step S5). The predetermined number N needs to be three or more in terms of determining the coordinates of the center of the circular outline of the workpiece and the radius of the workpiece. It is to be noted that the predetermined number N is set to four in this example embodiment.

If it is determined in step S5 that the measurement number n has not yet reached the predetermined number N, the centering controller 90 moves the position detection probe 71 away from the outer peripheral face of the workpiece, and then turns the rotary table 3 so as to rotate the workpiece by an angle of 2π/N (step S6). Then, the centering controller 90 returns to step S1, and repeats the processes in steps S1 to S4 until the measurement number n is determined as having reached the predetermined number N in step S5.

Figure 5:
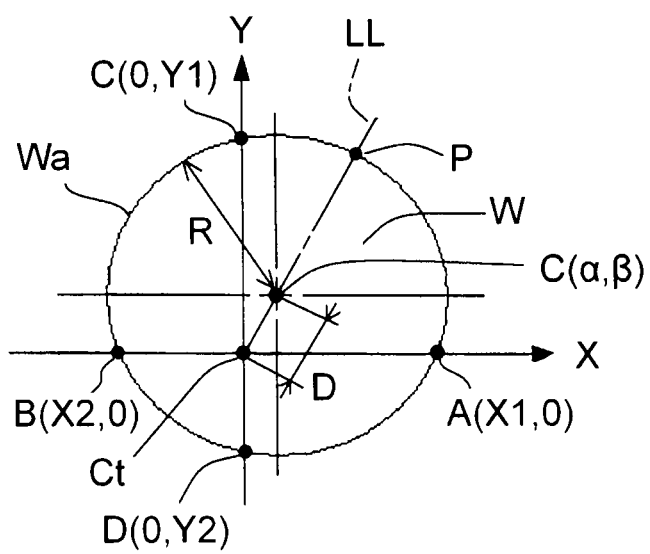
FIG. 5 is a view showing position measurement points of a workpiece to be centered.

On the other hand, if it is determined in step S5 that the measurement number n has reached the predetermined number N, the centering controller 90 calculates the amount of runout of the workpiece and the phase position of the workpiece, at which the runout amount is largest, based on the measured coordinates of the contact points (step S7). For example, as shown in FIG. 5, in a case where the coordinates of four points at an outer peripheral face Wa of a workpiece W, i.e., the coordinates A (X1, 0) of a point A, the coordinates B (X2, 0) of a point B, the coordinates C (0, Y1) of a point C, and the coordinates D (0, Y2) of a point D of the outer peripheral face Wa are measured in an X-Y rectangular coordinate system with their origin at the axis Ct of the rotation spindle 31 (rotary table 3), the coordinates (α, β) of a center C of the workpiece W and a radius R of the workpiece W are calculated according to Equations 1 to 3 shown below.

$$\alpha = (X1+X2)/2 \quad \text{Equation 1}$$

$$\beta = (Y1+Y2)/2 \quad \text{Equation 2}$$

$$R = ((X1-\alpha)^2 + \beta^2)^{0.5} \quad \text{Equation 3}$$

A runout amount D of the workpiece W is $(\alpha^2 + \beta^2)^{0.5}$, and an intersection point P between the outer peripheral face Wa of the workpiece W and a line LL extending from the axis Ct of the rotation spindle 31 (rotary table 3) through the center C of the workpiece W is the largest runout phase position. As such, because the measured contact points of the outer peripheral face of the workpiece are equiangularly offset from each other (each angular interval is 90 degrees in this example embodiment), the runout amount of the workpiece and the largest runout phase position of the workpiece are easily determined. However, it is to be noted that it is possible to determine the runout amount of the workpiece and the largest runout phase position of the workpiece even if the positions (i.e., coordinates) of contact points of the outer peripheral face of the workpiece that are not equiangularly offset from each other are measured, that is, even if the angular intervals between the respective contact points are not equal to each other.

In step S8, the centering controller 90 determines whether the runout amount of the workpiece is equal to or smaller than a reference value that is prescribed for the workpiece centering. If the runout amount of the workpiece is equal to or smaller than the reference value, the centering controller 90 determines that the workpiece has been centered and therefore exits the centering program. On the other hand, if the runout amount of the workpiece is larger than the reference value, the centering controller 90 moves the position detection probe 71 away from the outer peripheral face of the workpiece, and then causes, by turning the rotary table 3, the largest runout phase position of the workpiece, corresponding to the intersection point P shown in FIG. 5, to be opposed to the workpiece contact 84 (step S9).

Subsequently, the centering controller 90 moves the position detection probe 71 and the position detection block 85 in such directions that the position detection probe 72 and the position detection block 85 contact each other (step S10). Then, the centering controller 90 determines whether the position detection probe 71 has come into contact with the contact face 85a of the position detection block 85 (step S11). If it is determined that the position detection probe 71 has come into contact with the contact face 85a of the position detection block 85, the centering controller 90 measures the coordinates of the contact face 85a (step S12).

Then, because the positional relation between the contact face 85a of the position detection block 85 and the contact face of the workpiece contact 84, which comes into contact with the workpiece, is known, the centering controller 90 derives the relative positions of the largest runout phase position of the outer peripheral face of the workpiece and the contact face of the workpiece contact 84, based on the coordinates of the contact points of the outer peripheral face of the workpiece and the coordinates of the contact face 85a of the position detection block 85 (step S13).

Then, the centering controller 90 moves the workpiece contact 84 toward the workpiece such that the contact face of the workpiece contact 84 contacts the largest runout phase position of the outer peripheral face of the workpiece and pushes the workpiece by an amount corresponding to the runout amount (step S14). Subsequently, the centering controller 90 returns to step 1 and repeats the above-described processes of the centering program until the runout amount of the workpiece becomes equal to or smaller than the reference value. Through the processes described above, the workpiece W is centered accurately.

In the meantime, because the largest runout phase position of the workpiece is set to the position opposed to the workpiece contact 84 by turning the rotary table 3 in step S9, the relative positions are easily derived in step S13. However, it is to be noted that the angle by which the rotary table 3 is turned to bring the largest runout phase position of the workpiece to the position opposed to the workpiece contact 84 is obtained in advance, and therefore the process in step S9 may be executed after the process in step S13.

As described above, in the centering program, the position detection probe 71 is made to contact at least three circumferentially-offset points of the outer peripheral face of the workpiece on the rotary table 3, and the positions of the respective contact points between the position detection probe 71 and the workpiece are measured. Then, the amount of runout of the axis of the workpiece and the largest runout phase position of the workpiece are calculated based on the measured positions of the contact points on the outer peripheral face of the workpiece. As such, the position of the center of the workpiece and the radius of the workpiece are determined, and therefore the amount of runout of the axis of the workpiece with respect to the rotation axis of the rotary table 3 and the direction of the runout are accurately determined.

Subsequently, the rotary table 3 is turned so as to set the largest runout amount phase portion of the workpiece in the position opposed to the workpiece contact 84 of the centering apparatus 8. Then, the relative positions of the workpiece and the workpiece contact 84 are derived based on the positions of the contact points on the outer peripheral face of the workpiece and the position of the position detection block 85. As such, the relative positions of the workpiece and the position detection block 85 are determined. Then, because the positional relation between the contact face 85a of the position detection block 85 and the contact face of the workpiece contact 84, which comes into contact with the workpiece, is known, the position of the workpiece contact 84 relative to the workpiece is accurately derived. As a result of the processes described above, the positional relation among the workpiece, the rotary table 3, and the workpiece contact 84 is determined. Therefore, the centering shaft member 83 of the centering apparatus 8 is moved such that the workpiece contact 84 pushes the workpiece by an amount corresponding to the runout amount. In this way, the workpiece is centered accurately.

Figure 6:
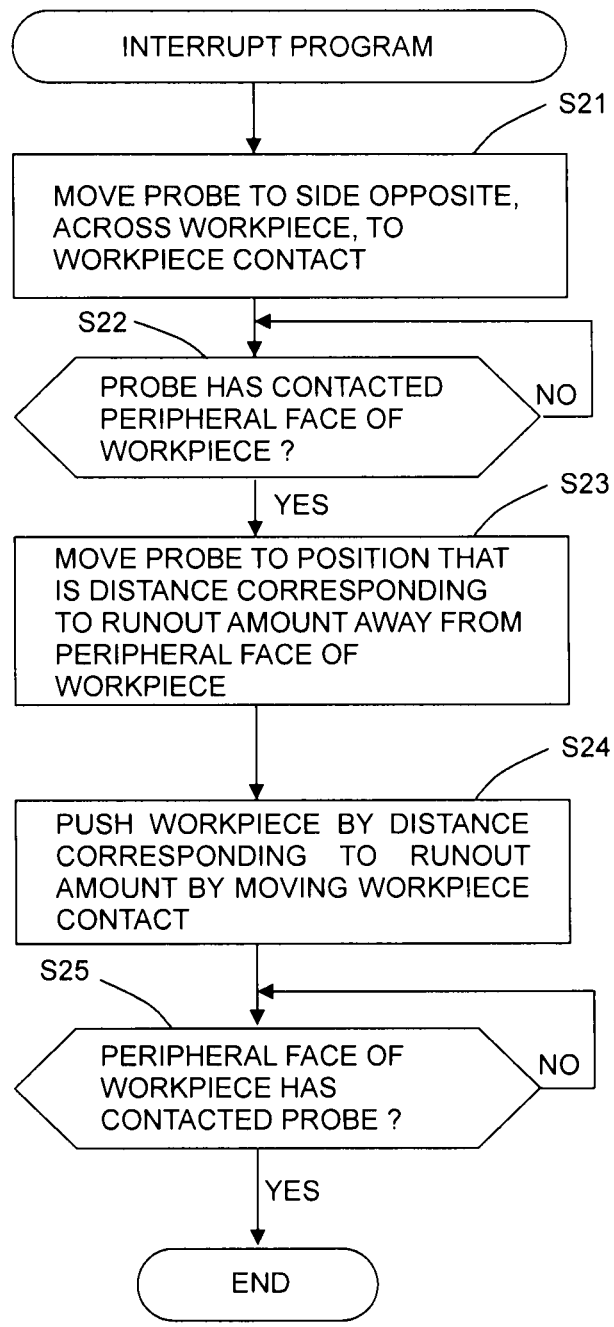
FIG. 6 is a flowchart illustrating the procedure of a program that may be executed as an interrupt in the centering program.

Next, an interrupt program that may be additionally executed in step S8 of the centering program described above will be described with reference to FIGS. 6, 7A, 7B, and 7C. As shown in FIG. 6, the centering controller 90 moves the position detection probe 71 to the side opposite, across the workpiece W, to where the workpiece contact 84 is present (step S21). Then, the centering controller 90 determines whether the position detection probe 71 has come into contact with the outer peripheral face Wa of the workpiece W (step S22).

Figure 7A:
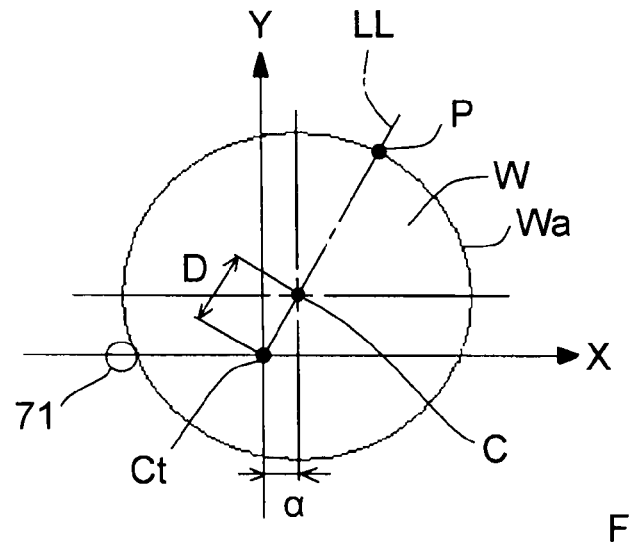
FIG. 7A, FIG. 7B and FIG. 7C are views illustrating the flow of centering performed according to the interrupt program illustrated in FIG. 6.
Figure 7B:
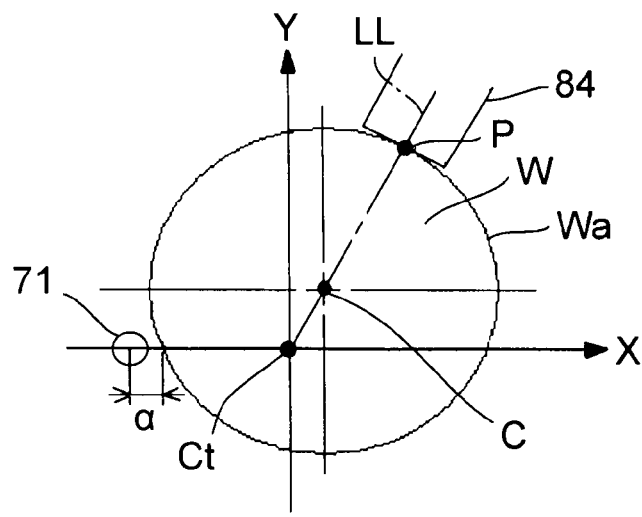

As shown in FIG. 7A, if the position detection probe 71 has come into contact with the outer peripheral face Wa of the workpiece W, the centering controller 90 then moves the position detection probe 71 to a position that is away, in the X-axis direction, from the outer peripheral face Wa of the workpiece W by a distance a corresponding to the runout amount D, and keeps the position detection probe 71 in the position (step S23), as shown in FIG. 7B. Then, the centering controller 90 moves the workpiece contact 84 toward the workpiece W so that the front end face of the workpiece contact 84 contacts a largest runout phase portion P of the outer peripheral face Wa of the workpiece W, and pushes the workpiece W toward the center C using the workpiece contact 84 (step S24).

Figure 7C:
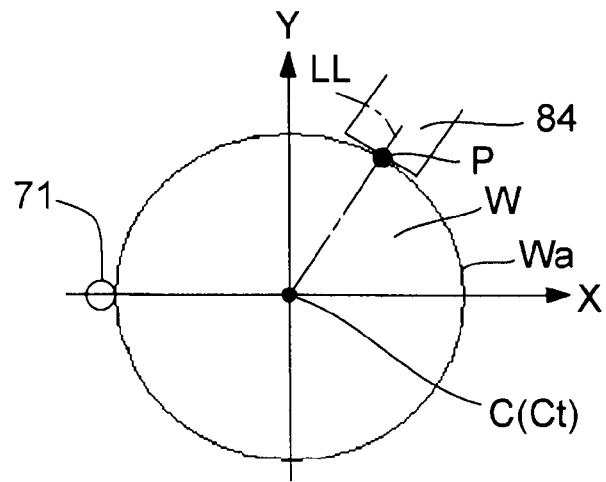

Then, the centering controller 90 determines whether the outer peripheral face Wa of the workpiece W has come into contact with the position detection probe 71 (step S25). At this time, if it is determined that the outer peripheral face Wa of the workpiece W has come into contact with the position detection probe 71 as shown in FIG. 7C, the centering controller 90 finishes the interrupt program. In this way, through the interrupt program, the centering controller 90 is able to determine that the position detection probe 71 has pushed the workpiece W accurately by the distance corresponding to the runout amount D, and this reduces the cycle time of the centering.

The centering apparatus 8 is inclined by the predetermined angle θ with respect to the line L in order to prevent a contact between the position detection probe 71 that moves on the line L running in the X-axis direction and the centering apparatus 8 in the foregoing example embodiment. However, the centering apparatus 8 may be provided on the line L if a contact between the position detection probe 71 and the centering apparatus 8 is prevented by, for example, controlling the movement of the position detection probe 71.

Further, while the workpiece is centered through the centering program described above using the centering apparatus 8 in the foregoing example embodiment, the workpiece may be centered through the centering program described above using a runout prevention apparatus or a shoe grinding machine, which is often used to machine a workpiece on the basis of its outer diameter, in place of the centering apparatus 8.

Further, while the centering is performed on the basis of the outer diameter of the workpiece to grind the outer peripheral face of the workpiece in the foregoing example embodiment, the centering program described above may be implemented in the same manner as above also when the workpiece is centered on the basis of the inner diameter of the workpiece to grind the inner peripheral face of the workpiece.

Further, while the position detection touch sensor 7 is provided at the slider 5 in the foregoing example embodiment, for example, the same effects and advantages as those described above may be obtained even if a position detection touch sensor having a device for moving the sensor in the X-axis direction is used in place of the position detection touch sensor 7. In this case, for example, the position detection touch sensor is provided at the bed 2.

What is claimed is:
1. A centering apparatus that centers a columnar or cylindrical workpiece set on a rotary table, comprising:
   a centering shaft member that is movable in a direction orthogonal to a rotation axis of the rotary table;
   a workpiece contact that is provided at the centering shaft member, and is adapted to come into contact with, as the contact shaft member moves, a peripheral face of the workpiece and push the workpiece in a radial direction of the workpiece;
   a position detection block that is provided at the centering shaft member;
   a position detection probe that is movable in a direction orthogonal to the rotation axis of the rotary table, and is adapted to come into contact with the workpiece and the position detection block; and
   a centering controller that controls centering of the workpiece through control of the centering shaft member and the position detection probe, wherein
   the centering controller comprises:
   workpiece peripheral face position measuring means for bringing the position detection probe into contact with at least three points of the peripheral face of the workpiece, which are offset circumferentially from each other, and measuring each contact position between the position detection probe and the workpiece, with rotation of the rotary table stopped;
   runout calculating means for calculating an amount of runout of an axis of the workpiece and a largest runout phase position that is a phase position of the workpiece, at which the runout amount is largest, based on the measured contact positions;
   block position measuring means for bringing the position detection probe into contact with the position detection block and measuring a position of the position detection block;

phase position indexing means for turning the rotary table so as to set the largest runout phase position of the workpiece in a position opposed to the workpiece contact;

relative position deriving means for deriving relative positions of the workpiece and the workpiece contact in a state where the largest runout phase position of the workpiece is in the position opposed to the workpiece contact as a result of turning of the rotary table, based on the contact positions measured by the workpiece peripheral face position measuring means and the position of the position detection block measured by the block position measuring means; and pushing means for, after the phase position indexing means sets the largest runout phase position of the workpiece in the position opposed to the workpiece contact, centering the workpiece by moving the centering shaft member based on the relative positions of the workpiece and the workpiece contact such that the workpiece contact pushes the workpiece by a distance corresponding to the runout amount.

2. The centering apparatus according to claim 1, wherein the at least three points of the peripheral face of the workpiece are equiangularly offset from each other.

3. The centering apparatus according to claim 1, wherein the position detection block has a contact face extending in a direction orthogonal to the direction in which the position detection probe moves.

4. The centering apparatus according to claim 1, wherein the centering apparatus is mounted on a bed on which the rotary table is provided.

5. The centering apparatus according to claim 1, wherein the position detection probe is moved to and kept in a position that is on a side opposite, across the workpiece, to where the workpiece contact is present and that is a distance corresponding to the runout amount away from the peripheral face of the workpiece, and the workpiece contact is made to push the workpiece until the peripheral face of the workpiece contacts the position detection probe.

6. The centering apparatus according to claim 1, wherein:
the centering shaft member is arranged so as to be inclined by a predetermined angle with respect to the direction in which the position detection probe moves; and
a face of the position detection block, which comes into contact with the position detection probe, is orthogonal to the direction in which the position detection probe moves.

7. A centering method implemented by a centering apparatus that centers a columnar or cylindrical workpiece set on a rotary table, comprising:
a centering shaft member that is movable in a direction orthogonal to a rotation axis of the rotary table;
a workpiece contact that is provided at the centering shaft member, and is adapted to come into contact with, as the contact shaft member moves, a peripheral face of the workpiece and push the workpiece in a radial direction of the workpiece;
a position detection block that is provided at the centering shaft member;
a position detection probe that is movable in a direction orthogonal to the rotation axis of the rotary table, and is adapted to come into contact with the workpiece and the position detection block; and
a centering controller that controls centering of the workpiece through control of the centering shaft member and the position detection probe, the centering method comprising:

workpiece peripheral face position measuring step of bringing the position detection probe into contact with at least three points of the peripheral face of the workpiece, which are offset circumferentially from each other, and measuring each contact position between the position detection probe and the workpiece, with rotation of the rotary table stopped;

runout calculating step of calculating an amount of runout of an axis of the workpiece and a largest runout phase position that is a phase position of the workpiece, at which the runout amount is largest, based on the measured contact positions;

block position measuring step of bringing the position detection probe into contact with the position detection block and measuring a position of the position detection block;

phase position indexing step of turning the rotary table so as to set the largest runout phase position of the workpiece in a position opposed to the workpiece contact;

relative position deriving step of deriving relative positions of the workpiece and the workpiece contact in a state where the largest runout phase position of the workpiece is in the position opposed to the workpiece contact as a result of turning of the rotary table, based on the contact positions measured in the workpiece peripheral face position measuring step and the position of the position detection block measured in the block position measuring step; and pushing step of, after setting the largest runout phase position of the workpiece in the position opposed to the workpiece contact in the phase position indexing step, centering the workpiece by moving the centering shaft member based on the relative positions of the workpiece and the workpiece contact such that the workpiece contact pushes the workpiece by a distance corresponding to the runout amount.

* * * * *